Figure 1:
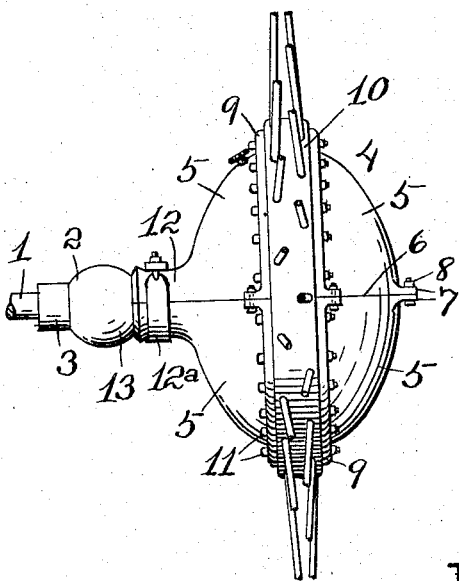
Figure 2:
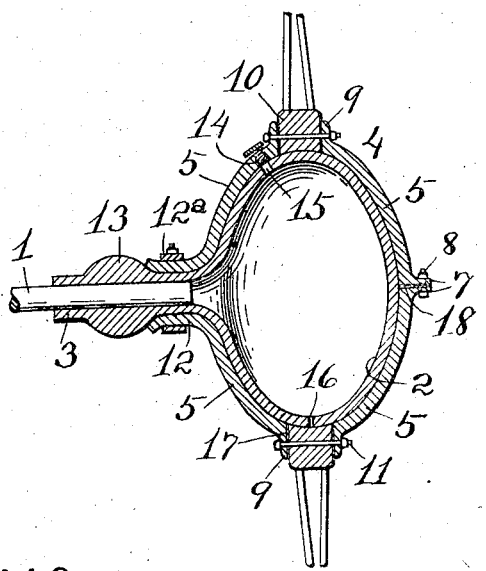
Figure 3:
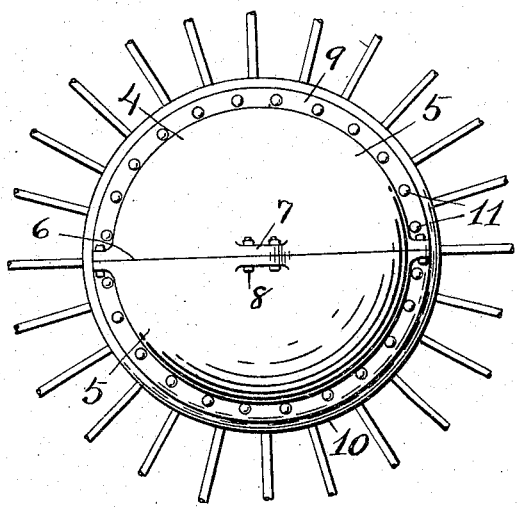

A. BONG.
LUBRICATING HUB.
APPLICATION FILED AUG. 15, 1911.

1,046,955.

Patented Dec. 10, 1912.

Witnesses
Stuart Hilder.
Frances W. Anderson.

Inventor
Albert Bong
by E. W. Anderson
his Attorneys.

UNITED STATES PATENT OFFICE.

ALBERT BONG, OF HERON LAKE, MINNESOTA.

LUBRICATING-HUB.

1,046,955.

Specification of Letters Patent. Patented Dec. 10, 1912.

Application filed August 15, 1911. Serial No. 644,253.

*To all whom it may concern:*

Be it known that I, ALBERT BONG, a citizen of the United States, resident of Heron Lake, in the county of Jackson and State of Minnesota, have made a certain new and useful Invention in Lubricating-Hubs; and I declare the following to be a full, clear, and exact description of the same, such as will enable others skilled in the art to which it appertains to make and use the invention, reference being had to the accompanying drawing, and to reference characters marked thereon, which form a part of this specification.

The invention has relation to anti-friction bearings, designed primarily for the hubs of vehicle wheels, having for its object to provide a self-lubricating bearing having a minimum expenditure of lubricant.

The invention is applicable to anti-friction bearings of all kinds, and particularly to the wheels of cars, trucks, wagons, wheel-mounted farming implements and machinery and other vehicles.

It consists in the novel construction and combinations of parts, as hereinafter set forth.

In the accompanying drawing, illustrating the invention as applied to a vehicle wheel, the numeral 1 designates a vehicle axle, to which is secured in any suitable manner the spindles 2, of similar character, and only one of which is shown. This spindle is a hollow shell of flattened globular form, with its greatest circumference in its vertical center, and is provided with an exterior tubular extension 3 from its flattened side for making the axle connection, said extension terminating at its inner end at said flattened side. Turning upon this ellipsoidal spindle is the hub 4 of the wheel, said hub being also hollow and of similar flattened globular form, to closely fit interiorly the exterior of the spindle. The hub shell is formed of four sections 5, 5, two upon each side, each section being semicircular, of the form of a diametrically divided flattened globe. The sections at each side have a straight diametric joint 6, in line with the center of the axle, and lug projections 7 at this joint, provided with bolts 8 engaging perforations thereof to connect the sections together. Each section has also a semicircular flange 9, which abuts against the inner spoke-carrying band 10 of the wheel, the opposite sections being secured to each other and to said band by a series of horizontal bolts 11 engaging perforations of the flanges and of said band, so that the hub turns with the wheel. The hub has also a tubular extension, indicated at 12, from its flattened side which closely engages and turns upon the extension of the spindle, a collar 13 of the extension 3 bearing against the end of the extension 12. A clip 12ᵃ serves to press the sections of the tubular extension 12 together. The hollow interior of the spindle serves as an oil chamber, the oil being fed through a lateral perforation 14 of the hub and through an upper lateral perforation 15 of the hollow spindle, with which the hub perforation will register in turning.

The lower central part of the spindle is provided with a small exit perforation 16 for the oil, which will find its way into the joint between the spindle and hub and effectually lubricate the parts.

The oil may collect in the hollow spindle nearly up to the vertical center thereof before there will be any likelihood of escape of the oil.

If desired a packing 17 may be inserted at the joints between the flanges of the opposite sections and the spoke-carrying band, although this is not deemed essential.

It is preferred to provide a packing 18 of paper or other suitable material where the hub sections upon each side are joined. As the parts become worn a greater or less amount of this packing may be removed to take up the wear.

Owing to the elliptical vertical spread of the spindle and hub the wheel will be braced to turn truly in its plane of movement.

The invention is equally applicable to the bearing for a rotary shaft or for a wheel of any kind, as will be readily understood. As applied to a vehicle wheel, the greatest weight of the load will be at the vertical center of the hollow spindle and wheel hub which are strongly arched to support it.

Having thus described my invention, what I claim as new and desire to secure by Letters Patent is:

1. In an anti-friction bearing, an interior hollow high-arched ellipsoidal member, an exterior hollow high-arched ellipsoidal member fitting closely thereupon and composed of two sections at each side thereof, the sections at each side having a diametric joint, one of the members being stationary and the other member capable of rotation, said interior member having an extension projecting outward from a flattened side thereof and terminating at its inner end at said side, an axle having connection with said extension, an intermediate member, bolt connections for securing together said intermediate member and the sections of said exterior member and bolt connections for securing together the sections of the exterior member at each side thereof, the cavity of the interior member being adapted to contain oil and said interior member having an oil exit opening in communication with the joint between the members.

2. In an anti-friction bearing, a hollow high-arched ellipsoidal spindle member, having an extension projecting outward from a flattened side thereof and terminating at its inner end at said side, an axle having connection with said extension, a hollow high-arched ellipsoidal hub member fitting closely upon the spindle member and composed of two sections at each side, the sections at each side having a diametric joint and the sections at one side having a diametrically divided tubular extension from a flattened side thereof surrounding said axle extension, an intermediate spoke-carrying band, bolt connections for securing together said band and the sections of said hub member, and bolt connections for securing together the sections of the hub member at each side thereof, said spindle member having an opening for the supply of oil to the cavity thereof, and an oil exit opening in communication with the joint between the members, and a clamping band surrounding said tubular extension.

In testimony whereof I affix my signature in presence of two witnesses.

ALBERT BONG.

Witnesses:
HENRY G. ROSTOMILY,
A. H. SMITH.

Copies of this patent may be obtained for five cents each, by addressing the "Commissioner of Patents, Washington, D. C."